Figure 1:
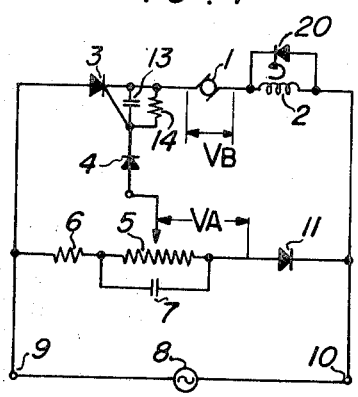

United States Patent [19]
Soeda

[11] 3,803,468
[45] Apr. 9, 1974

[54] SPEED CONTROL SYSTEM FOR A. C. SERIES COMMUTATOR MOTOR

[75] Inventor: Katsuji Soeda, Sukagawa, Japan

[73] Assignee: Yamamoto Electric Industrial Co., Ltd., Sukagama-shi, Fukushima-ken, Japan

[22] Filed: June 8, 1972

[21] Appl. No.: 261,099

[30] Foreign Application Priority Data
Dec. 29, 1971   Japan.................................. 46-2889
Feb. 8, 1972    Japan............................... 47-13820
Feb. 8, 1972    Japan............................... 47-13821

[52] U.S. Cl.................. 318/249, 318/338, 318/345, 318/356
[51] Int. Cl. ............................................. H02p 5/16
[58] Field of Search .......... 318/251, 331, 345, 355, 318/356, 249, 250, 338, 528, 532, 534

[56] References Cited
UNITED STATES PATENTS

| | | | |
|---|---|---|---|
| 3,271,648 | 9/1966 | Weed | 318/345 |
| 3,402,338 | 9/1968 | Thoresen | 318/345 |
| 3,523,234 | 8/1970 | Turtle | 318/345 |
| 3,582,738 | 6/1971 | Claasen | 318/331 |
| 3,377,536 | 4/1968 | Bacquart | 318/331 |
| 3,414,791 | 12/1968 | Munson | 318/331 |
| 3,619,752 | 11/1971 | Bateika | 318/331 |
| 3,319,591 | 5/1967 | Hamlett | 318/345 |
| 3,559,019 | 1/1971 | Kato | 318/345 |
| 3,293,523 | 12/1966 | Hutson | 318/331 |
| 3,328,613 | 6/1967 | Gawron | 318/345 |
| 3,374,758 | 3/1968 | Mais | 318/345 |

*Primary Examiner*—Bernard A. Gilheany
*Assistant Examiner*—Thomas Langer
*Attorney, Agent, or Firm*—Armstrong & Wegner

[57] ABSTRACT

A speed control system for an a.c. series commutator motor having a field winding connected in series with the armature, including a current supply circuit having a thyrister connected between the motor and an a.c. power supply for intermittently supplying a rectified current to the motor during a conducting period of time determined by an external signal, and a control signal generating circuit for generating the external signal which is related to a predetermined voltage derived from the a.c. voltage of the a.c. power supply and a voltage induced in the motor. In the speed control system, a discharge circuit including a rectifier element is connected in a parallel feedback relationship with the field winding so that the electrical energy accumulated in the field winding by the current supplied to the motor can be discharged through the discharge circuit during the period of time in which the current supply is interrupted.

3 Claims, 10 Drawing Figures

SPEED CONTROL SYSTEM FOR A. C. SERIES COMMUTATOR MOTOR

This invention relates to a speed control system for small-sized a.c. series commutator motors and more particularly to a system of the above kind which employs a thyristor for regulating the speed of the motor.

Hitherto, the speed of small-sized a.c. series commutator motors for use in sewing machines and the like was controlled by adjusting the resistance of a resistor connected in series with the motor thereby limiting the current supplied to the motor. However, this manner of speed control was defective in that the motor torque was reduced at low speeds and the speed varied over a very wide range depending on the load. In an effort to eliminate these defects, speed control circuits employing a reverse blocking triode thyristor such as a silicon controlled rectifier and/or a bidirectional triode thyristor such as one sold by the trade name of TRIAC have been developed. Most of these circuits have yielded an undesirable reduction in torque in the low speed range due to alternating current flowing through the armature. Further, such circuits have relied solely upon the feedback of the EMF induced by the residual magnetism of the motor to regulate the triggering of the thyristor. The drawback with this approach is that the amount of residual magnetism in the motor has been very small due to the fact that electric steel or soft steel has been generally used to form the magnetic the EMF of the motor. Thus, theEMF produced by the residual magnetism has been small as has the amount of the speed factor that can be fed back to the silicon controlled rectifier. Further, the residual magnetism, being variable depending on the quality of the steel used in the motor, has produced a feedback of induced EMF which has been undesirable in that the circuit performance has been subject to fluctuations over a wide range.

It is therefore an object of the present invention to provide a novel and improved speed control system for a small-sized a.c. series commutator motor which eliminates undesirable instability in the speed of the motor and low torque during operation in a low speed range.

In accordance with the present invention, there is provided a speed control system for an a.c. series commutator motor having a field winding connected in series with the armature, comprising current supplying means connected between said motor and an a.c. power supply for intermittently supplying a rectified current to said motor during a conducting period of time which is determined by an external signal, a control signal generating circuit for generating said external signal which is related to a predetermined voltage derived from the a.c. voltage of said a.c. power supply and a voltage induced in said motor, and a discharge circuit connected in parallel feedback relation with said field winding so that the electrical energy accumulated in said field winding by the current supplied to said motor can be discharged through said discharge circuit during the period of time in which said current supply is interrupted.

According to the present invention having the features set forth in the above, the commutator motor is driven by direct current and the direction of the voltage induced in the motor is always opposite to the direction of the power supply voltage, so that the current supplying means including a thyristor can be controlled depending on the induced voltage. Further, by virtue of the disposition of the discharge circuit including a rectifier element in parallel with the field winding, the electrical energy accumulated in the field winding energizes the field during the non-conducting period of time of the thyristor thereby increasing the electromotive force induced in the armature. Thus, the thyristor can respond accurately to variations in the speed of the motor thereby attaining a satisfactory speed control.

The above and other objects, features and advantages of the present invention will be apparent from the following detailed description taken in conjunction with the accompanying drawings, in which;

FIGS. 1 to 10 are schematic wiring diagrams of various embodiments of the present invention.

In FIGS. 1 to 10 showing various embodiments of the present invention, like reference numerals are used to denote like parts, thus the explanation of some of these parts may be omitted.

Referring first to FIG. 1 showing an embodiment of the present invention, armature winding 1 of an a.c. series commutator motor is connected at one end thereof to one end of field winding 2, while the other end is connected to the cathode of reverse blocking triode thyristor 3 such as a silicon controlled rectifier. The other end of field winding 2 is connected to one output terminal 10 of a.c. power supply 8. The anode of silicon controlled rectifier 3 is connected to the other output terminal 9 of a.c. power supply 8. Resistor 6 is connected at one end thereof to power supply terminal 9 and at the other end thereof to the anode of rectifier element 11 through variable resistor 5. The cathode of rectifier element 11 is connected to power supply terminal 10, and the slide arm of variable resistor 5 is connected to the anode of another rectifier element 4 whose cathode is connected to the gate of silicon controlled rectifier 3. Capacitor 7 and another rectifier element 20 are connected in parallel with variable resistor 5 and field winding 2 respectively. Rectifier element 20 is connected in such a direction that the anode and cathode thereof are disposed on the side of power supply terminal 10 and the armature respectively.

In operation, suppose that silicon controlled rectifier 3 is in the non-conducting state, and during one of the half cycles of the a.c. voltage applied from a.c. power supply 8, terminal 9 starts to be positive relative to the terminal 10. The current path in this case is traced from power supply terminal 9 - resistor 6 - variable resistor 5 - rectifier element 11 to power supply terminal 10, and capacitor 7 is charged by the charge-discharge characteristic determined by the resistances of resistor 6 and variable resistor 5 and the capacitance of capacitor 7. A voltage $V_A$ having a polarity as shown appears across the slide arm of variable resistor 5 and the anode of rectifier element 11. This voltage is necessarily applied to the gate of silicon controlled rectifier 3 through rectifier element 4. On the other hand, an electromotive force $V_B$ having a polarity as shown appears across armature winding 1 since the armature is continuously rotating while cutting across the field of the residual magnetism in the magnetic poles. Therefore, silicon controlled rectifier 3 conducts when the voltage $(V_A-V_B)$ attains the triggering voltage level, thereby providing the flow of motor current. A reduction in the motor speed for a reason such as increased loading during the non-conducting period of time of silicon controlled rectifier 3 results in a corresponding reduction in induced electromotive force $V_B$ and the triggering voltage level is reached earlier. Thus, the speed of the motor is increased again to attain the rated speed automatically. The speed of the motor can be regulated by adjusting variable resistor 5 since the magnitude of $V_A$ is determined by the position of the slide arm of variable resistor 5. In the next half cycle of the power supply voltage, the polarity of voltage $V_A$ is reversed and silicon controlled rectififer 3 does not conduct.

If the above speed control circuit is not provided with the rectifier element 20 the circuit would not provide an effective feedback of electromotive force $V_B$ since the residual magnetism is small for the reasons described previously. According to the present invention, however, rectifier element 20 is connected in parallel with field winding 2 as seen in FIG. 1. This element allows the electrical energy accumulated in field winding 2 to dissipate as a flow of discharge current through rectifier element 20 in the direction shown when silicon controlled rectifier 3 stops conducting to interrupt the flow of motor current. The flow of discharge current serves to energize the magnetic poles. Since the direction of this excitation is the same as the direction of the residual magnetism, induced electromotive force $V_B$ is increased to increase the amount of the speed factor fed back to silicon controlled rectifier 3 thereby ensuring the desired stability in the speed control. Further, undesirable fluctuations of the speed control performance depending on the quality of electric steel or soft steel used in the magnetic poles of the a.c. commutator motor can be suppressed to a minimum since the effect of the electromotive force induced by the discharge current flowing through the discharge circuit is far greater than the effect of the electromotive force induced by the residual magnetism. Capacitor 13 and resistor 14 are connected in parallel across the cathode and gate of silicon controlled rectifier 3 in order to prevent silicon controlled rectifier 3 from conducting accidentally due to a reduction in the apparent forward blocking voltage in response to an abrupt variation of the applied voltage.

The maximum speed of the motor, which is obtained by moving the slide arm of variable resistor 5 to the position most adjacent to resistor 6, is naturally lower when rectifier element 20 is present than when absent from the circuit. The primary purpose of providing rectifier element 20 for increasing the amount of the speed factor fed back to the silicon controlled rectifier 3 is to increase the torque and eliminate the instability in the rotating speed of the motor during operation in a low speed range. During operation in a high speed range, the motor develops a large torque and achieves a relatively stable rotation.

Figure 2:
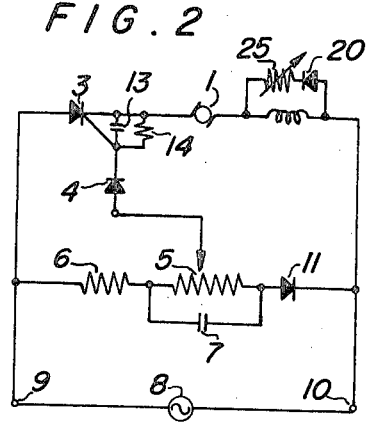

In FIG. 2, the circuit is modified to accommodate a high speed motor operation. Referring to FIG. 2, semi-fixed variable resistor 25 is connected in series with rectifier element 20 and is suitably adjusted to limit the discharge current thereby varying the amount of the speed factor fed back to the silicon controlled rectifier 3. Thus, the maximum speed of the motor can be suitably selected by regulating the variable resistor 25 as desired.

Figure 3:
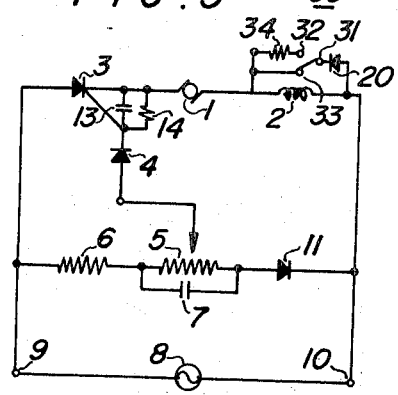

In another modification shown in FIG. 3, switch 30, comprising movable contact 31 and a pair of stationary contacts 32 and 33, is included so that the motor can operate as a two-speed motor. Referring to FIG. 3, the cathode of rectifier element 20 is connected to movable contact 31 of switch 30, and stationary contact 32 of the switch 30 is connected through resistor 34 to the junction point between armature and field windings 1 and 2, while the other stationary contact 33 of switch 30 is connected directly thereto. Resistor 34 acts to limit the discharge current thereby limiting the amount of the speed factor fed back to silicon controlled rectifier 3.

Figure 4:
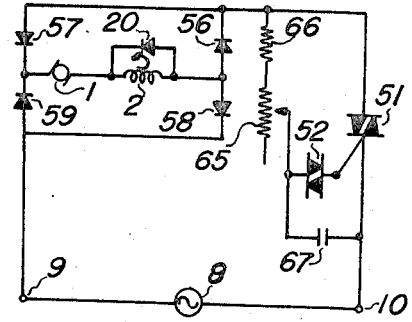

Another embodiment of the present invention shown in FIG. 4 comprises bidirectional triode thyristor 51, e.g., one sold by the trade name of TRIAC, and a bidirectional diode thyristor 52, e.g., one sold by the trade name of DIAC. A plurality of rectifier elements 56, 57, 58 and 59 constitute a full-wave rectifier circuit for the full-wave rectification of alternating current supplied to the a.c. series commutator motor from a.c. power supply 8 by way of output terminals 9 and 10. One end of armature winding 1 is connected to one end of a field winding 2, while the other end is connected to the cathode ends of rectifier elements 57 and 59. Rectifier elements 56 and 58 are connected at their anode ends to the other end of field winding 2. One terminal 9 of a.c. power supply 8 is connected to the cathode of rectifier element 58 and to the anode of rectifier element 59. The second electrode of bidirectional triode thyristor 51 is connected to the anode of rectifier element 57 and to the cathode of rectifier element 56. The first electrode of thyristor 51 is connected to the other terminal 10 of a.c. power supply 8. Resistor 66 is connected at one end thereof to the second electrode of thyristor 51 and at the other end thereof to one end of variable resistor 65. The slide arm of the variable resistor 65 is connected to the first electrode of the thyristor 51 through a capacitor 67 and to the trigger electrode of the thyristor 51 through the bidirectional diode thyristor 52.

In operation, suppose that bidirectional triode thyristor 51 is in the non-conducting state in either direction, and during one of the half cycles of the a.c. voltage applied from a.c power supply 8, terminal 9 starts to be positive relative to terminal 10. Current flows from power supply terminal 9 - rectifier element 59 - armature winding 1 - field winding 2 - rectifier element 56 - resistor 66 - variable resistor 65 - capacitor 67 to the other power supply terminal 10 to charge capacitor 67. When the terminal voltage of capacitor 67 attains the breakdown peak voltage level of bidirectional diode thyristor 52, thyristor 52 conducts to trigger bidirectional triode thyristor 51. Due to the conduction of thyristor 51, current flows continuously through the path which is traced from power supply terminal 9 - rectifier element 59 - armature winding 1 - field winding 2 - rectifier element 56 - thyristor 51 - to other-power supply terminal 10 until power supply voltage becomes zero. At zero power supply voltage, thyristor 51 is rendered non-conducting to interrupt the flow of motor current. The period of time required for the terminal voltage of capacitor 67 to attain the breakdown peak voltage level for bidirectional diode thyristor 52 can be adjusted by suitably varying the resistance of variable resistor 65. In the next half cycle, the direction of the voltage charging capacitor 67 is opposite to the direction in the preceding half cycle, and thyristor 52 conducts in the reverse direction thereby triggering thyristor 51. Current flows now through the path which is traced from power supply terminal 10 - thyristor 51 - rectifier element 57 - armature winding 1 - field winding 2 - rectifier element 58 to the other power supply terminal 9.

In this embodiment, the a.c. series commutator motor is operated by the direct current obtained by the full-wave rectification of alternating current so that its performance is similar to that of a d.c. series commutator motor. Thus, a large starting torque can be developed by the motor and the motor rotates stably especially in a low speed range. Further, due to the fact that the direction of the electromotive force induced in the armature by the residual magnetism in the magnetic poles in opposite to the direction of the power supply voltage during the non-conducting period of time of bidirectional triode thyristor 51 and capacitor 67 is charged by the difference therebetween, the conducting period of time of bidirectional triode thyristor 51 is controlled depending on variations in the speed of the motor in such a manner that the operating speed of the motor can be automatically maintained somewhat constant. Thus, a more stable feedback of the speed factor to the bidirectional triode thyristor 51 can be realized.

Rectifier element 20 is also provided so that the electrical energy accumulated in the field winding 2 can be discharged in a direction shown by the arrow in FIG. 4 thereby ensuring an even greater stability in the operation of the control circuit. If rectifier element 20 were not provided in the circuit, the electrical energy accumulated in field winding 2 of the motor would be discharged through the path consisting of rectifier elements 56 and 57 and armature winding 1 as well as through the path consisting of rectifier elements 58 and 59 and armature winding 1 when the power supply voltage becomes zero. This current also flows through the field winding 2 to energize the magnetic poles. The direction of this excitation is the same as the direction of the residual magnetism, and therefore, the induced electromotive force is increased thereby increasing the amount of the speed factor fed back to the thyristor 51. However, due to the fact that the armature is included in the discharged circuit for this current, the discharge current is rapidly attenuated due to the large impedance to such an extent that the current value is too small to enhance the effect of feedback. Further, due to the fact that the direction of the discharge current flowing through the armature is opposite to the direction of the electromotive force induced by the residual magnetism, the electromotive force is weakened. The provision of rectifier element 20 in parallel with field winding 2 as seen in FIG. 4 eliminates the defect above described. Since rectifier element 20 is connected in parallel with field winding 2, the discharge current produced by the electrical energy accumulated in field winding 2 flows through rectifier element 20 in the direction shown by the arrow in FIG. 4 to energize the magnetic poles as soon as the power supply voltage becomes zero and bidirectional triode thyristor 51 is rendered non-conducting. The direction of this excitation is the same as the direction of the residual magnetism and the induced electromotive force is thereby increased. Thus, the amount of the speed factor fed back to bidirectional triode thyristor 51 is increased to attain a stable speed control as described in detail with reference to FIG. 1.

Figure 5:
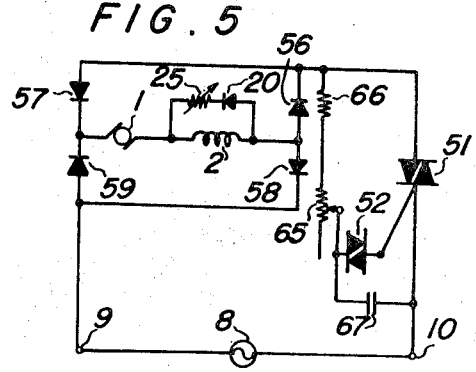

FIG. 5 shows a modification of the embodiment shown in FIG. 4. In FIG. 5, variable resistor 25 is disposed in the discharge circuit connected in parallel with field winding 2 in order to control the discharge current. The technical merit of the additional provision of variable resistor 25 is entirely the same as that described with reference to FIG. 2. Similarly, the operation of the other circuit elements is entirely the same as that described with reference to FIG. 4.

Figure 6:
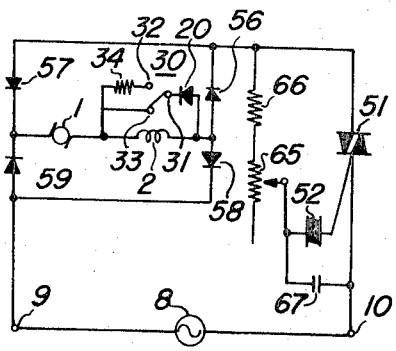

FIG. 6, showing another modification of the embodiment of FIG. 4, further includes change-over switch 30 disposed in the discharge circuit so that rectifier element 20 can be selectively connected to the junction point between armature and field windings 1 and 2 through series resistor 34 or to the same directly. The technical merit of switch 30 is apparent from the description given with reference to FIG. 3.

Figure 7:
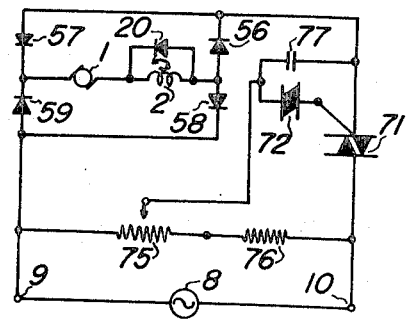

Referring to the embodiment of FIG. 7, a plurality of rectifier elements 56, 57, 58 and 59 constitute a full-wave rectifier circuit for the full-wave rectification of alternating current supplied to the a.c. series commutator motor from a.c. power supply 8 by way of output terminals 9 and 10 as described in conjunction with FIG. 4. Terminal 9 of a.c. power supply 8 is connected to one of the input terminals of the motor circuit including the full-wave rectifier circuit, that is, the junction point between the anode of rectifier element 59 and the cathode of rectifier elements 58. The other input terminal of the motor circuit, that is, the junction point between the anode of rectifier element 57 and the cathode of rectifier element 56 is connected to the second electrode of bidirectional triode thyristor 71, thence through the first electrode of thyristor 71 to the other terminal 10 of a.c. power supply 8. Variable resistor 75 and resistor 76 are connected in series across a.c. power supply 8. The slide arm of variable resistor 75 is connected to the trigger electrode of bidirectional triode thyristor 71 through bidirectional diode thyristor 72 and to the second electrode of thyristor 71 through capacitor 77.

In operation, suppose that both thyristors 71 and 72 are in the non-conducting state, and during one of the half cycles of the a.c. voltage applied from a.c. power supply 8, terminal 9 starts to be positive relative to terminal 10. Current flows through the path which is traced from power supply terminal 9 - rectifier element 59 - armature winding 1 - field winding 2 - rectifier element 56 - capacitor 77 - variable resistor 75 - resistor 76 to the other power supply terminal 10 to charge capacitor 77. Rectifier element 20 is connected in parallel with field winding 2 so that it functions in a manner similar to that described with reference to FIG. 1. The power supply voltage is divided by series resistors 75 and 76, and capacitor 77 is charged with the voltage of such a magnitude which is obtained by subtracting the voltage induced in the motor from the divided voltage appearing across the slide arm of variable resistor 75 and terminal 9 so that the speed factor can be fed back to thyristor 71 in a greater degree than in the circuit of FIG. 4. When the terminal voltage of capacitor 77 attains the breakdown peak voltage level of thyristor 72, thyristor 72 conducts to trigger thyristor 71 which is therefore rendered conducting. The current having charged capacitor 77 flows continuously through the path which is traced from power supply terminal 9 - rectifier element 59 - armature winding 1 - field winding 2 - rectifier element 56 - thyristor 71 to the other power supply terminal 10 until the power supply voltage becomes zero. At zero power supply voltage, both thyristors 71 and 72 are rendered non-conducting. As soon as the next half cycle appears, current flows through the path which is traced from power supply terminal 10 - resistor 76 - variable resistor 75 - capacitor 77 - rectifier element 57 - armature winding 1 - field winding 2 - rectifier element 58 to the other power supply terminal 9 to charge capacitor 77 again. When the terminal voltage of capacitor 77 attains the breakdown peak voltage level of thyristor 72, thyristor 72 conducts in a direction opposite to the direction of conduction during the preceding half cycle and triggers thyristor 71 which then conducts in a direction opposite to the direction of conduction during the preceding half cycle. The above manner of operation is repeated thereafter. The magnitude of the voltage charging capacitor 77 can be varied by varying the position of the slide arm of variable resistor 75, thereby varying the duration of conduction of thyristor 72, hence thyristor 71. Thus, the speed of the motor can be varied as desired.

Figure 8:
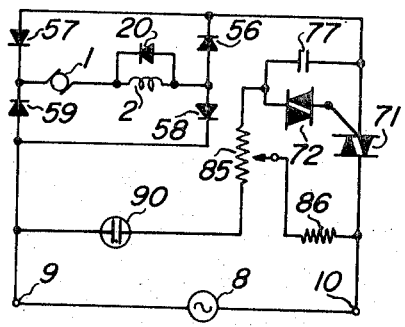

FIG. 8 shows a modification of the circuit shown in FIG. 7. In FIG. 8, the combination of variable resistor 75 and resistor 76 in FIG. 7 is replaced by the combination of variable resistor 85, resistor 86 and neon discharge tube 90 as shown.

In operation, suppose that, during one of the half cycles of the a.c. voltage applied from the a.c. power supply 8, terminal 9 starts to be positive relative to the other terminal 10. Current flows through the path which is traced from power supply terminal 9 - rectifier element 59 - armature winding 1 - field winding 2 - rectifier element 56 - capacitor 77 - variable resistor 85 - resistor 86 to the other power supply terminal 10 to charge capacitor 77. Due to the fact that the power supply voltage is low and the charging current is large in the initial stage of charging, a large voltage drop occurs across resistor 86 and a small voltage is applied across a voltage-regulator element, e.g. neon discharge tube 90. As the power supply voltage becomes higher and the capacitor is gradually charged, the voltage drop across resistor 86 is reduced and the voltage applied across neon discharge tube 90 is increased to an extent that discharge takes place in neon discharge tube 90. With the discharge of neon dis-charge tube 90, the voltage charging capacitor 77 is reduced and the capacitor 77 is subsequently charged along a charging curve of gentle gradient. It will thus be seen that the motor speed can be easily and stably regulated over a wide range. The function of the remaining circuit elements is entirely the same as that described in connection with FIG. 7.

Figure 9:
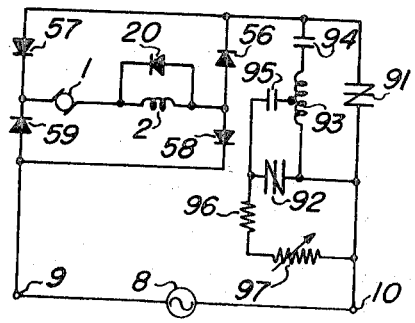

FIG. 9 shows another embodiment of the present invention or a modification of the embodiment shown in FIG. 4. The combination of bidirectional triode thyristor 51, bidirectional diode thyristor 52, variable resistor 65, resistor 66 and capacitor 67 shown in FIG. 4 is replaced by the combination of a pair of bidirectional diode thyristors 91 and 92 such as those sold by the trade name of SSS, boosting autotransformer 93, capacitors 94 and 95, resistor 96 and variable resistor 97.

In operation, suppose that, during one of the half cycles of the a.c. voltage applied from a.c. power supply 8, terminal 9 starts positive relative to the other terminal 10. Current flows from power supply terminal 9 - rectifier element 59 - armature winding 1 - field winding 2 - rectifier element 56 - capacitor 94 - autotransformer 93 to the other power supply terminal 10 while charging capacitor 94. Further, a part of the current flows through the intermediate tap of autotransformer 93 - capacitor 95 - resistor 96 - variable resistor 97 to power supply terminal 10 while charging capacitor 95. When initially the terminal voltage of capacitor 95 attains the breakdown peak voltage level of the bidirectional diode thyristor 92, thyristor 92 conducts and capacitor 95 discharges through the autotransformer 93. Resonance occurs depending on the capacitance of capacitor 95 and the inductance of the autotransformer 93, thereby producing a pules wave of damped oscillation. This pulse wave is boosted by boosting autotransformer 93 to be applied together with the power supply voltage to bidirectional diode thyristor 91 through capacitor 94, thereby rendering the thyristor 91 conducting. Thyristors 91 and 92, capacitors 94 and 95, and boosting autotransformer 93 are suitably selected so that the above operation can be reliably carried out. Variable resistor 97 controls the conduction starting timing of thyristor 92. Thereafter, the system operates in a manner as described previously.

Figure 10:
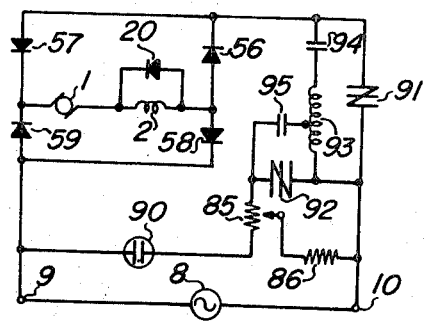

The system shown in FIG. 10 is generally similar to that shown in FIG. 9 except that the combination of resistor 96 and variable resistor 97 in the latter is replaced by the combination of variable resistor 85, resistor 86 and neon discharge tube 90. The operation of the system shown in FIG. 10 is apparent from the description given with reference to FIGS. 9 and 8.

In the fourth, fifth, sixth and seventh embodiments of the present invention above described, the triggering element may be a neon discharge tube in lieu of the bidirectional diode thyristor. Further, in all the embodiments of the present invention, the speed regulating variable resistor may be replaced by a photoconductive element so as to regulate the speed by means of light although such means is not illustrated in the drawings.

While several embodiments of the invention have been shown and described, other variations will be readily apparent to those skilled in the art. Therefore, the invention is not limited to these embodiments but is intended to cover all such variations as may be within the scope of the invention defined by the following claims.

What we claim is:

1. A speed control system for an a. c. series commutator motor having a field winding connected in the series with the armature, said system comprising:
   a. current supplying means for intermittently supplying a rectified current to said motor during a conducting period of time which is determined by an external signal, said current supplying means including a first bidirectional diode thyristor and full-wave rectifier means having two input terminals and two output terminals, the series circuit of said armature and field winding being connected across said two output terminals, one of said two input terminals being connected to one of the terminals of an a.c. power supply, the other input terminal being connected to the other terminal of said a.c. power supply through said first bidirectional diode thyristor;
   b. a control signal generating circuit for generating said external signal which is related with a predetermined voltage derived from the a.c. voltage of said a.c. power supply and a voltage induced in said motor, said control signal generating circuit including a first series circuit of a first capacitor and a tapped inductance element connected across the two electrodes of said first bidirectional diode thyristor and a second series circuit of a second capacitor and resistor means, the free end of said second capacitor being connected to the tap of said inductance element, said resistor means being connected at the free end thereof to said other terminal of said a.c. power supply;

c. triggering means including a second bidirectional diode thyristor connected between the end of said inductance element remote from said first capacitor and the junction point between said second capacitor and said resistor means; and d. a discharge circuit connected in parallel with said field winding such that the electrical energy accumulated in said field winding by the current supplied to said motor is discharged through said discharge circuit during the period of time in which said current supply is interrupted.

2. A speed control system as claimed in claim 1, in which said discharge circuit includes a series connection of a variable resistor and a rectifier means connected in parallel with said field winding.

3. A speed control system as claimed in claim 1, in which said discharge circuit includes a rectifier means connected in parallel with said field winding through a change-over switch such that said rectifier element is connected to said field winding through a resistor when said switch is in a first position and said rectifier element is directly connected to said field winding when said switch is in a second position.

* * * * *

UNITED STATES PATENT OFFICE
CERTIFICATE OF CORRECTION

Patent No. 3,803,463      Dated 4/9/74

Inventor(s) KATSUJI SOEDA

It is certified that error appears in the above-identified patent and that said Letters Patent are hereby corrected as shown below:

Line [31], delete "46-2889" and insert in its place --47-2889--.

Signed and sealed this 10th day of September 1974.

(SEAL)
Attest:

McCOY M. GIBSON, JR.      C. MARSHALL DANN
Attesting Officer      Commissioner of Patents